US012486876B2

(12) United States Patent
Binder et al.

(10) Patent No.: US 12,486,876 B2
(45) Date of Patent: Dec. 2, 2025

(54) ELECTROMAGNETIC CLUTCH COMPRISING A SELECTOR SLEEVE (71) Applicant: Hoerbiger Antriebstechnik Holding GmbH, Schongau (DE)

(72) Inventors: Juergen Binder, Schongau (DE); Peter Echtler, Schongau (DE); Andreas Dempfle, Schongau (DE); Werner Fuerguth, Schongau (DE); Wolfgang Voelk, Schongau (DE); Oleg Butorin, Schongau (DE); Sebastian Kucharek, Schongau (DE); Martin Sedlmair, Schongau (DE)

(73) Assignee: HOERBIGER ANTRIEBSTECHNIK HOLDING, Schongau (DE)

(*) Notice: Subject to any disclaimer, the term of this patent is extended or adjusted under 35 U.S.C. 154(b) by 0 days.

(21) Appl. No.: 18/655,949

(22) Filed: May 6, 2024

(65) Prior Publication Data

US 2024/0376941 A1 Nov. 14, 2024

(30) Foreign Application Priority Data

May 9, 2023 (DE) .............................. 102023112192

(51) Int. Cl.
*F16D 27/118* (2006.01)
*F16D 27/00* (2006.01)
*F16D 27/108* (2006.01)
*F16D 27/14* (2006.01)

(52) U.S. Cl.
CPC .......... *F16D 27/118* (2013.01); *F16D 27/108* (2013.01); *F16D 27/14* (2013.01); *F16D 2027/007* (2013.01)

(58) Field of Classification Search
CPC ...... F16D 27/118; F16D 27/108; F16D 27/14; F16D 2027/007; F16D 2300/006; F16D 11/10; F16D 11/14; F16D 2011/002; F16D 2011/008
See application file for complete search history.

(56) References Cited

U.S. PATENT DOCUMENTS

| 2,535,388 | A | * | 12/1950 | Burks ..................... F16D 11/10 192/48.91 |
| 4,744,449 | A | | 5/1988 | Sekella et al. |
| 11,065,957 | B2 | * | 7/2021 | Maruyama ............. B60K 17/35 |

(Continued)

FOREIGN PATENT DOCUMENTS

DE 102013205174 A1 * 9/2014 ........... F16D 27/004
GB 883608 A 12/1961

Primary Examiner — Richard M Lorence
(74) Attorney, Agent, or Firm — McNees Wallace & Nurick (57) ABSTRACT An electromagnetic clutch is provided which includes—a selector sleeve arranged in a rotationally fixed manner on a first shaft and is adapted to be shifted linearly along the first shaft between an engaged and a disengaged state, a coupling body which is aligned coaxially to the first shaft, a stator which has a coil which serves to shift an armature ring linearly along the first shaft, the armature ring being mounted radially in an axial guide separately from the first shaft and the coupling body, wherein a shifting of the armature ring by the coil is also accompanied by a shifting of the selector sleeve. A method of closing and opening an electromagnetic clutch is also included herein.

13 Claims, 10 Drawing Sheets (56) References Cited

U.S. PATENT DOCUMENTS

| | | |
|---|---|---|
| 11,460,078 B2 | 10/2022 | Cioc |
| 2009/0173590 A1 | 7/2009 | Xaiolan |
| 2020/0132180 A1* | 4/2020 | Tsuzuki .................... B60K 1/00 |
| 2023/0086003 A1* | 3/2023 | Binder .................... F16D 11/14 |
| | | 192/69 |

* cited by examiner

ELECTROMAGNETIC CLUTCH COMPRISING A SELECTOR SLEEVE

TECHNICAL FIELD

The disclosure relates to an electromagnetic clutch and to a method of closing and opening an electromagnetic clutch.

BACKGROUND

Clutches are usually used if a torque is to be transmitted temporarily from one shaft to another shaft aligned coaxially thereto without these two shafts being permanently connected to each other. A distinction is made between frictionally engaged and positive clutches. The present disclosure is limited to positive clutches.

Displaceable selector sleeves are often used for clutches with a form-fitting engagement of rotating parts for transmitting torque. These parts have one or also more different toothings which engage in mating toothings so that a fit in a form-fitting manner (also called a "positive fit") is created via which a torque can be transmitted from one shaft to another one.

The prior art discloses electromagnetic clutches in which the displaceable selector sleeve is shifted by a coil which exerts a magnetic force on the selector sleeve. In the context of the electromagnetic clutch according to the disclosure as described below, the armature which also forms the selector sleeve, is exclusively referred to as selector sleeve below. The obtainable shifting forces acting on the selector sleeve in a magnetic clutch largely depend on the air gaps between the stator and the armature (selector sleeve). Both the radial and the axial air gaps have an influence on the level of the shifting force. As the axial air gap is specified by the required stroke (shifting travel), the force can substantially be influenced by the size of the radial air gap. The selector sleeve is guided along a shaft, the selector sleeve having an internal toothing which engage into an external toothing provided on the shaft, so that the selector sleeve is adapted to be shifted along the shaft as explained above and is coupled thereto in a rotationally fixed manner.

Due to the backlash of toothings between the selector sleeve and the shaft (hub), an irregular radial gap can also be produced between the stator and the selector sleeve as seen over the circumference. This is in particular the case when the components do not rotate and the selector sleeve is supported on the shaft toothing due to the weight force. As a result of rotation and the centrifugal forces which are then effective, the components are aligned with the tooth flanks, and a regular air gap is produced along the circumference between the stator and the selector sleeve.

An irregular radial air gap is problematic in that the magnetic flux through the components also leads to radial forces which prevent the selector sleeve from moving due to the frictional forces.

As a result, the shifting force transmitted from the coil to the selector sleeve cannot be set accurately. It is also possible that the shifting force acting along the circumference of the selector sleeve is not uniform.

Furthermore, deviations can occur upon installation of the electromagnetic clutch to the shaft due to tolerances, which influence the positioning of the selector sleeve relative to the coil, so that the radial gap may vary.

In summary, the effective axial shifting force acting on the selector sleeve also depends on the radial air gaps. Due to an increased air gap, the shifting force decreases, wherein the latter is also reduced by a varying and irregular radial gap (due to the transversal forces). Against this background, it is the object of the disclosure to provide an electromagnetic clutch in which a total shifting force can be applied to the selector sleeve which is as constant and reproducible as possible and acts uniformly in the axial shifting direction as seen over the circumference.

SUMMARY

The disclosure provides an electromagnetic clutch comprising a selector sleeve which is arranged in a rotationally fixed manner on a first shaft and is adapted to be shifted linearly along the first shaft between an engaged and a disengaged state, a coupling body which is aligned coaxially to the first shaft, wherein in the engaged state, there is a fit in a form-fitting manner between the selector sleeve and the coupling body and thus a rotary connection between the first shaft and the coupling body, and a stator which has a coil which serves to shift an armature ring linearly along the first shaft, the armature ring being mounted radially in an axial guide separately from the first shaft and the coupling body, wherein a shifting of the armature ring by means of the coil is also accompanied by a shifting of the selector sleeve.

The basic idea of the disclosure is to ensure a uniform and minimum radial gap between the armature ring and the stator or the coil of the stator by supporting or guiding the armature ring.

The guiding of the armature ring is carried out inside the stator and is thus separated from the clutch or the rotating shaft. In this way, the armature ring can be guided in an accurate manner and with a small radial air gap within the stator by the axial guide. As there is no relative speed between the armature ring and the stator, no wear occurs between the components in case of contact. The radial air gap between the armature ring and the stator can thus be reduced to a minimum.

The additional axial guidance allows the armature ring to be aligned more precisely relative to the coil than if a guidance is carried out only via the first shaft, the coupling body or the selector sleeve itself.

The defined radial air gap thus created around the armature ring makes it possible to apply magnetic forces to the armature ring constantly and uniformly along the circumference of the armature ring.

As a shifting of the armature ring is also accompanied by a shifting of the selector sleeve, the shifting force also acts uniformly along the circumference of the selector sleeve.

According to one aspect of the disclosure, the armature ring and the selector sleeve may be different parts which are adapted to be coupled to each other in the axial direction, the armature ring having a first axial resting surface which contacts a second axial resting surface provided on the selector sleeve at least when the armature ring is shifted by means of the coil.

As the armature ring and the selector sleeve are different parts, these can be made of different materials and be processed or treated differently. Accordingly, the armature ring can for example be made of a material having advantageous ferromagnetic properties, while this does not necessarily have to be the case for the selector sleeve.

In this multipart variant, the armature ring is radially mounted in the axial guide separately from the selector sleeve.

Furthermore, the selector sleeve can for example be thermally treated to influence the material properties, such as hardening the selector sleeve or areas of the selector sleeve.

The first and the second axial resting surface allow the shifting forces to be transmitted in a simple and uniform manner to the selector sleeve when the armature ring is shifted by means of the coil.

Optionally, the first and/or the second resting surface may be coated with a lubricant layer and/or hardened.

This proves to be particularly advantageous if there is a relative movement between the selector sleeve and the armature ring which causes friction when the first and the second resting surface are in contact, which can thus also lead to wear of the resting surfaces.

A lubricant layer on at least one of the resting surfaces allows friction between the first and the second rest to be reduced at a relative speed between the selector sleeve and the armature ring. The wear of the resting surfaces is thus lower than if neither the first nor the second axial resting surface were provided with a lubricant layer.

If at least one of the resting surfaces is hardened, it is thus also ensured that wear which may occur if the resting surfaces are in contact, is less than with untreated surfaces.

If at least one of the two resting surfaces is both hardened and coated with a lubricant layer, the aforementioned advantages are combined such that there is low friction and particularly low wear when the resting surfaces are in contact and move relative to each other.

Advantageously, the armature ring may comprise an L-shaped circumferential profile having a flange which projects radially inwards from a circular cylinder and has the first axial resting surface.

This is a particularly simple and robust design to provide the first resting surface. The magnetic force acting axially on the armature ring is also transmitted to the selector sleeve by the end-face rest of the first resting surface in the axial direction of movement. The shifting force can thus be transmitted in a radially uniform manner from the armature ring to the selector sleeve over a large area.

Optionally, the fit in a form-fitting manner between the selector sleeve and the coupling body in the engaged state may be achieved by a coupling toothing having undercuts, the undercuts being configured such that the application of torque to the clutch results in an additional shifting of the selector sleeve towards the coupling body.

The additional shifting of the selector sleeve towards the coupling body results in a relative movement between the selector sleeve and the armature ring in the axial direction. Consequently, the first and the second axial resting surface are not in contact with each other.

Due to the separation of the resting surfaces in the engaged state when torque is applied and the selector sleeve is moved further in the axial direction, any wear can be reduced or prevented.

Alternatively, the selector sleeve can also form the armature ring. Accordingly, the armature ring and the selector sleeve are not formed as separate parts, but in one piece.

Therefore, the axial guide and the selector sleeve designed as an armature ring move relative to each other in the engaged state and when the selector sleeve rotates.

It is conceivable that similar to the above explanations, the contact surfaces between the axial guide and the selector sleeve designed as an armature ring are provided with a lubricant layer and/or are hardened.

Alternatively, it is also conceivable that the axial guide itself is supported, so that a rotary movement of the selector sleeve results in an entrainment of the axial guide.

Advantageously, a shifting of the armature ring by the coil may be limited by a stop. Furthermore, a magnetic holding force acting on the armature ring may be present when the armature ring and the stop are in contact when the coil is energized.

If the armature ring contacts the stop, this leads to a high magnetic holding force which is present event if only low current intensities flow through the coil.

This high magnetic holding force is due to the air gaps reduced to a minimum both in the radial and in the axial direction.

As a result, the power loss when holding the armature ring on the stop, can be considerably reduced by lowering the current intensity, without the armature ring being unintentionally detached from the stop.

Furthermore, it can thus be also ensured that the fit in a form-fitting manner of the coupling tooting is released by a shifting of the selector sleeve.

Furthermore, the stop allows a defined position of the armature ring when the selector sleeve is shifted into the engaged state, and holds the latter in its position in case the armature ring and the selector ring are formed separately from each other and the coupling toothing is provided with undercuts as explained above.

Advantageously, the stator can comprise at least an outer housing which extends partially along the coil, and a guiding geometry is formed between the outer housing and the armature ring and/or between the additional guiding element and the armature ring which takes over the axial guidance of the armature ring along the axis of the first shaft. A defined radial air gap can thus be achieved between the armature ring and the outer housing of the stator.

Optionally, the guiding geometry can have at least one guiding web which projects into a guiding groove and prevents a rotation of the armature ring relative to the stator, and a radial guiding surface which guides the armature ring concentrically to the stator.

If the armature ring and the selector sleeve are designed as separate parts, the additional guiding element may be a disk which is coupled in a rotationally fixed manner on the one hand to the outer housing of the stator and, on the other hand, to the armature ring.

The guiding element in the shape of a disk is particularly space-saving, easy to manufacture and makes it possible to guide the armature ring concentrically to the stator and to align it to the first shaft in a simple manner.

Furthermore, the energized coil can exert a magnetic force on the armature ring which acts via the armature ring on the selector sleeve towards the disengaged state or towards the engaged state, an elastic spring unit being provided, which exerts a restoring force on the selector sleeve which acts in a direction opposite to the magnetic force.

Depending on the case of application, it can thus be decided individually whether the clutch is to be closed or open when the coil is not energized.

Furthermore, the elastic spring unit ensures that in case of a deflection of the selector sleeve into the engaged or disengaged state, the selector sleeve is automatically reset as soon as the amount of the restoring force of the elastic spring unit exceeds the amount of the shifting force of the coil.

Optionally, the restoring force which is exerted on the selector sleeve by the elastic spring unit may also act on the armature ring. Accordingly, a resetting of the selector sleeve via the elastic spring unit is also accompanied by a resetting of the armature ring.

The elastic spring unit may be arranged inside the selector sleeve and be supported in the axial direction directly or indirectly on the selector sleeve and on the first shaft. The arrangement of the elastic spring unit inside the selector sleeve is particularly space-saving. Furthermore, due to the arrangement inside the selector sleeve, the elastic spring unit can be guided around the first shaft by the selector sleeve. A support of the elastic spring unit directly or indirectly on the selector sleeve and on the first shaft has the advantage that the spring unit can exert the restoring force on the selector sleeve uniformly in the axial direction by a support on the first shaft.

A supporting ring on which the elastic spring unit is supported in the axial direction is optionally arranged inside the selector sleeve.

The supporting ring for the elastic spring unit can be connected to the selector sleeve with a fit in a form-fitting manner, by an intermaterial bond or with a frictional fit.

Furthermore, the supporting ring may be designed as a bayonet ring which can establish a bayonet connection with the selector sleeve and on which the elastic spring unit is supported in the axial direction.

Accordingly, during mounting, the elastic spring unit can first be inserted into the selector sleeve and fastened by means of the bayonet ring between the first shaft and the bayonet ring itself. Furthermore, the bayonet ring allows a simple mounting within the selector sleeve.

The bayonet connection can be formed, on the one hand, by a circumferential groove and a first toothing which are each provided on the interior side of the selector sleeve towards the first shaft, and, on the other hand, by a second toothing which is provided on the bayonet ring.

Therefore, to mount the bayonet ring inside the selector sleeve, the bayonet ring is first aligned such that the toothings of the bayonet ring and the selector sleeve do not overlap and the bayonet ring can be inserted axially into the selector sleeve.

If the second toothing provided on the bayonet ring is located in the circumferential groove inside the selector sleeve, the bayonet ring can be rotated relative to the selector sleeve.

The bayonet ring can be rotated such that the first and the second toothing overlap at least partially, as a result of which the bayonet ring is fixed axially by the toothing inside the selector sleeve, wherein the elastic spring unit may be pretensioned with the bayonet ring inserted, so as to urge the bayonet ring against the selector sleeve.

Advantageously, the elastic spring unit can comprise at least one wave spring. A wave spring constitutes a cost-effective and simple component which is particularly suitable as the restoring force of the elastic spring unit acting on the selector sleeve can act uniformly along the circumference of the selector sleeve via the wave spring.

It is also conceivable that the at least two wave springs are provided which each have lugs which engage into a recess, so that the at least two wave springs cannot rotate relative to each other. The at least two wave springs allow the spring travel to be increased, which results in that the axial relative movement of the selector sleeve to the first shaft can be increased.

The object mentioned in the introductory part is furthermore achieved by a method of opening and closing an electromagnetic clutch according to the disclosure, comprising the following steps:

a) applying voltage to the coil and generating a magnetic force acting on the armature ring in a first direction;
b) thus shifting the selector sleeve from the initial position and towards an engaged or disengaged state;
c) canceling or reducing the magnetic force acting on the armature ring; and
d) shifting the selector sleeve in a direction opposite to the direction of the magnetic force by a restoring force exerted on the selector sleeve by the spring unit.

The advantages resulting therefrom can be taken from the above explanations.

DETAILED DESCRIPTION

Figure 1:
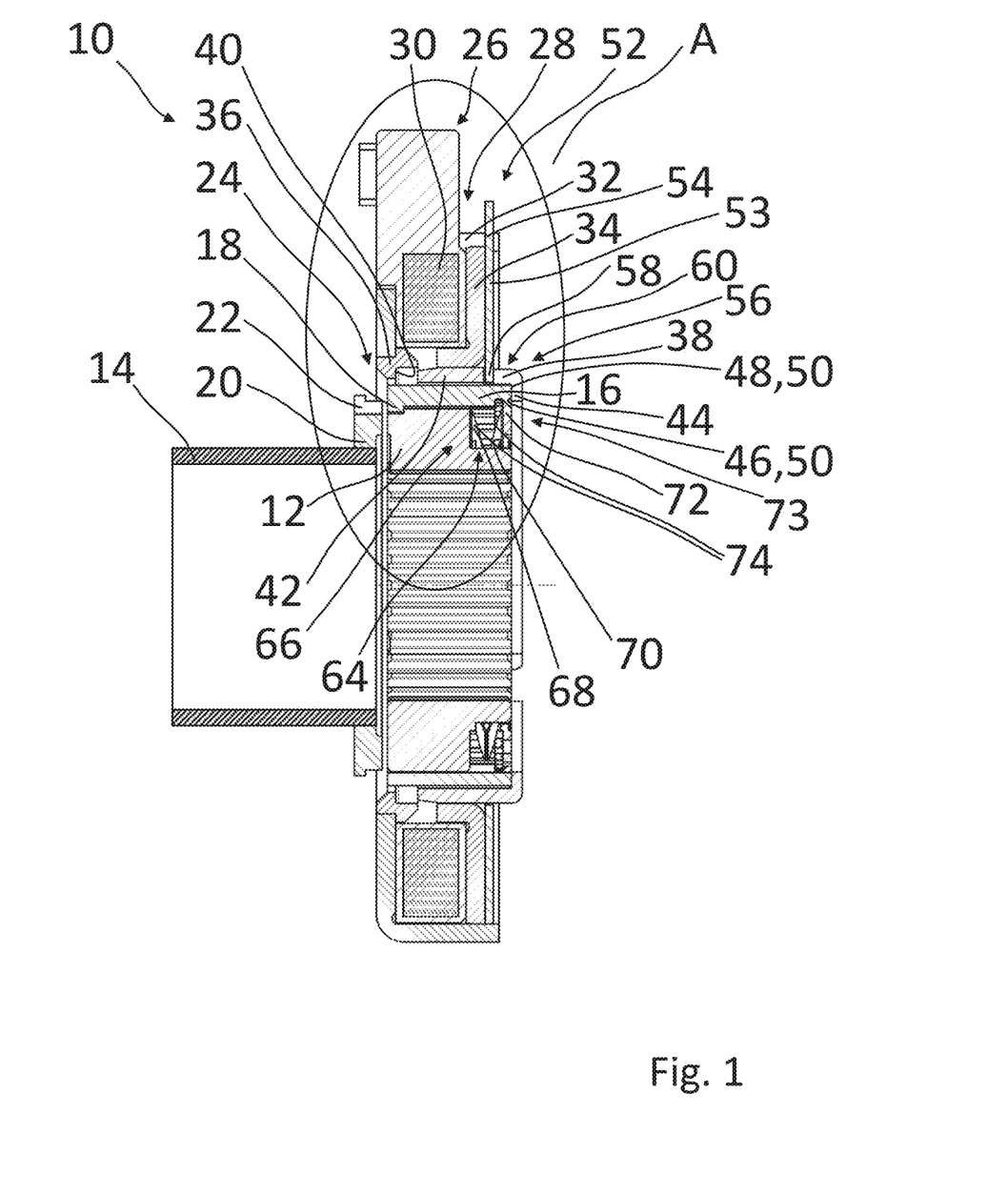
FIG. 1 shows a sectional view of an electromagnetic clutch according to the disclosure with a selector sleeve in the disengaged state.

FIG. 1 shows an electromagnetic clutch 10 which serves to couple a first shaft 12 and a second shaft 14 aligned coaxially to the first shaft 12 to each other by opening and closing.

The electromagnetic clutch 10 comprises a selector sleeve 16 which has first teeth 18 radially inside along the first periphery. Furthermore, the selector sleeve 16 is arranged in a rotationally fixed manner on the first shaft 12 and is adapted to be shifted linearly along the latter between an engaged and a disengaged state. FIG. 1 shows the selector sleeve 16 in the disengaged state.

A coupling body 20 which is coupled to the shaft 14 in a rotationally fixed manner is assigned to the second shaft 14.

The coupling body 20 has second teeth 22 which are arranged along the outer periphery of the coupling body. Furthermore, the coupling body 20 is aligned coaxially to the first shaft 12.

It is however also conceivable that the coupling body 20 forms part of the second shaft 14 and is formed integrally therewith.

The first and second teeth 18, 22 of the selector sleeve 16 and of the coupling body 20 are positioned at the ends of the shafts 12, 14.

The first and second teeth 18, 22 serve to form a fit in a form-fitting manner in the form of a coupling toothing 24 between the selector sleeve 16 and the coupling body 20 in the engaged state of the selector sleeve 16.

It is conceivable that the coupling toothing 24 formed by the first and the second teeth 18, 22 has undercuts at least at the first teeth 18 and/or the second teeth 22, which are configured such that when the selector sleeve is in the engaged state and torque is applied to the clutch, an additional shifting of the selector sleeve 16 towards the coupling body 20 occurs. This can be achieved by undercuts widening in a wedge-shape so that a wedge effect is created towards a completely engaged state if torque is transmitted.

In addition, a stator 26 is provided which comprises an outer housing 28 and a coil 30 which is at least partially received in the outer housing 28.

The outer housing 28 is subdivided into a housing pot 32 which extends along the periphery of the coil 30 and along an end face of the coil 30.

The outer housing 28 further has a housing ring 34 which extends along the periphery of the coil 30 and also on the end face of the coil 30 opposite to the housing pot 32.

A housing-side stop ring 36 is further provided, which is arranged in the area of the inner periphery of the coil 30. Alternatively, it is also conceivable that the housing pot 32 and/or the housing ring 34 surround(s) the stop ring 36.

The coil 30 serves to shift an armature ring 38 linearly along the first shaft in the direction of the engaged state of the selector sleeve 16 towards the coupling body 20.

Alternatively, it is also conceivable that the coil 30 serves to shift the armature ring 38 along the first shaft 12 towards the disengaged state of the selector sleeve 16.

The movement of the armature ring 38 linearly along the first shaft 12 towards the engaged state of the selector sleeve 16 is limited by a stop 40 provided on the stop ring 36.

The armature ring 38 extends along the outer periphery of the selector sleeve 16. It has an L-shaped circumferential profile with a flange 44 which projects radially inwards from a circular-cylindrical section 42.

The armature ring 38 and the selector sleeve 16 are coupled to each other in the axial direction. A shifting by the coil 30 which exerts a magnetic force on the armature ring 38 when it is energized, is also accompanied by a shifting of the selector sleeve 16.

To this end, the armature ring 38 has a first axial resting surface 46 which is provided on the side of the radially inwardly projecting flange 44 which faces the selector sleeve 16.

In addition, the selector sleeve 16 has a second axial resting surface 48 which is provided on the end face on the side of the selector sleeve 16 which faces away from the coupling body 20 and is opposite the first axial resting surface 46. According to FIG. 1, the first and the second axial resting surface 46, 48 are already in contact in the disengaged state.

This can also be the case if the selector sleeve 16 is in the engaged state.

Here, it is possible that the selector sleeve 16 and the armature ring 38 move relative to each other so that friction is generated between the first and the second axial resting surface 46, 48, which may lead to wear.

To reduce friction and prevent wear of the resting surfaces 46, 48, the first axial resting surface 46 and/or the second axial resting surface 48 can be coated with a lubricant layer and/or hardened.

Furthermore, the armature ring 38 is mounted radially in an axial guide 52 separately from the first shaft 12 of the selector sleeve 16 and from the coupling body 20.

In this multipart variant, the armature ring 38 is also radially mounted in the axial guide 52 separately from the selector sleeve 16.

A defined radial air gap can thus be created between the armature ring 38 and the outer housing 28 of the coil 30.

Figure 2:
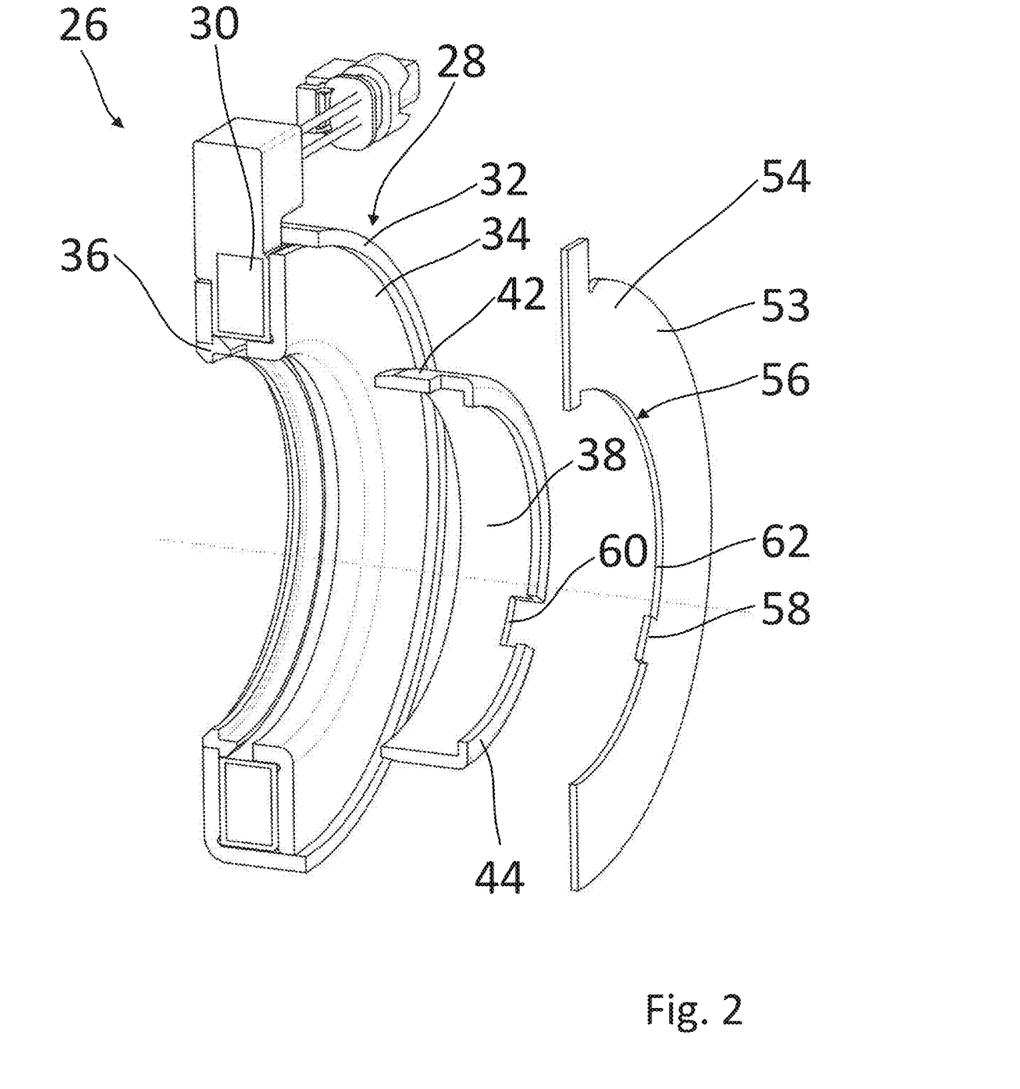
FIG. 2 shows a perspective exploded view of a stator with an armature ring of the electromagnetic clutch of FIG. 1.

The axial guide 52 comprises a guiding element 54 configured as a disk 53 and having a guiding geometry 56 (see FIG. 2). The guiding element 54 is coupled in a rotationally fixed manner to the housing pot 32 of the outer housing 28 and the armature ring 38 and takes over the axial guidance of the armature ring along the axis of the first shaft 12.

The guiding geometry 56 of the guiding element 54 has a guiding web 58 to guide the armature ring 38, which projects into a guiding groove 60 of the armature ring 38 and prevents the armature ring 38 from rotating relative to the stator 26.

The guiding geometry 56 also comprises a radial guiding surface 62 which is provided along the inner periphery of the guiding element 54 and through which the armature ring 38 is guided along the exterior envelope surface of the circular-cylindrical section 42 when it is shifted along the first shaft 12 concentrically to the stator 26.

Alternatively, the additional guiding element 54 may also be omitted and the guiding geometry 56 may be provided on the outer housing 28.

Furthermore, an elastic spring unit 64 is provided, via which the selector sleeve 16 is coupled to the first shaft 12 so as to be displaceable in the axial direction.

The elastic spring unit 64 is arranged between the selector sleeve 16 and the first shaft 12 such that a relative shifting of the selector sleeve 16 in the axial direction towards the engaged state results in a compression of the elastic spring unit 64.

A restoring force is thus produced which is exerted on the selector sleeve 16 by the first elastic spring unit 64.

The restoring force acts in a direction opposite to the magnetic force of the coil 30.

The elastic spring unit 64 is arranged inside der selector sleeve 16, the spring unit 64 being supported in the axial direction directly or indirectly on the selector sleeve 16 and on the first shaft 12.

The elastic spring unit 64 is accommodated in a space 66 (see FIG. 4) which is delimited by the first shaft 12 radially on the interior side. Radially on the exterior side, the space 66 is delimited by the selector sleeve 16.

Figure 4:
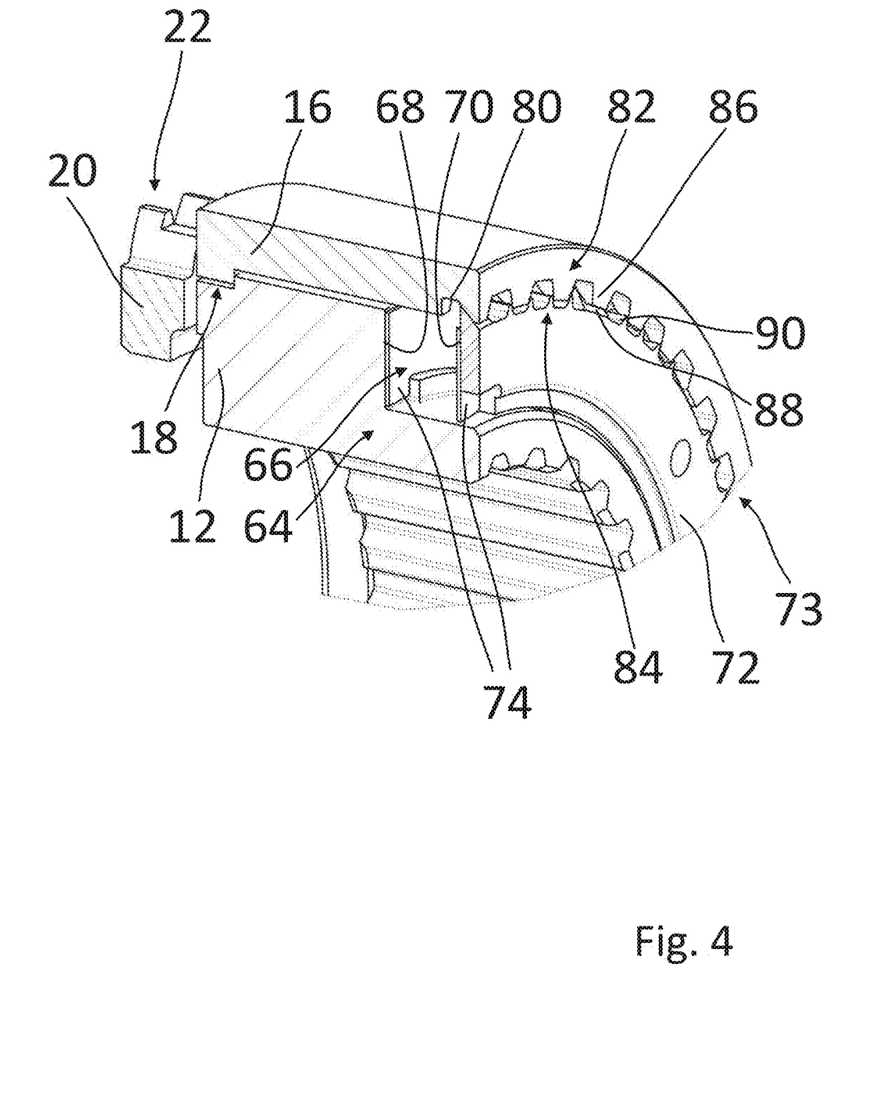
FIG. 4 shows a perspective detailed view in section of the selector sleeve, the coupling body and the first shaft.

In the axial direction, the space 66 is delimited by a first axial surface 68 which is provided on the end face on the first shaft 12, and by a second axial surface 70 which is provided on a bayonet ring 72 associated with the selector sleeve 16 and coupled to the selector sleeve 16 via a bayonet connection 73.

The elastic spring unit 64 provided within the space 66 comprises at least one wave spring 74 arranged within the space 66. Alternatively, the spring unit 64 can also comprise a pack of a plurality of wave springs 74.

Figure 3:
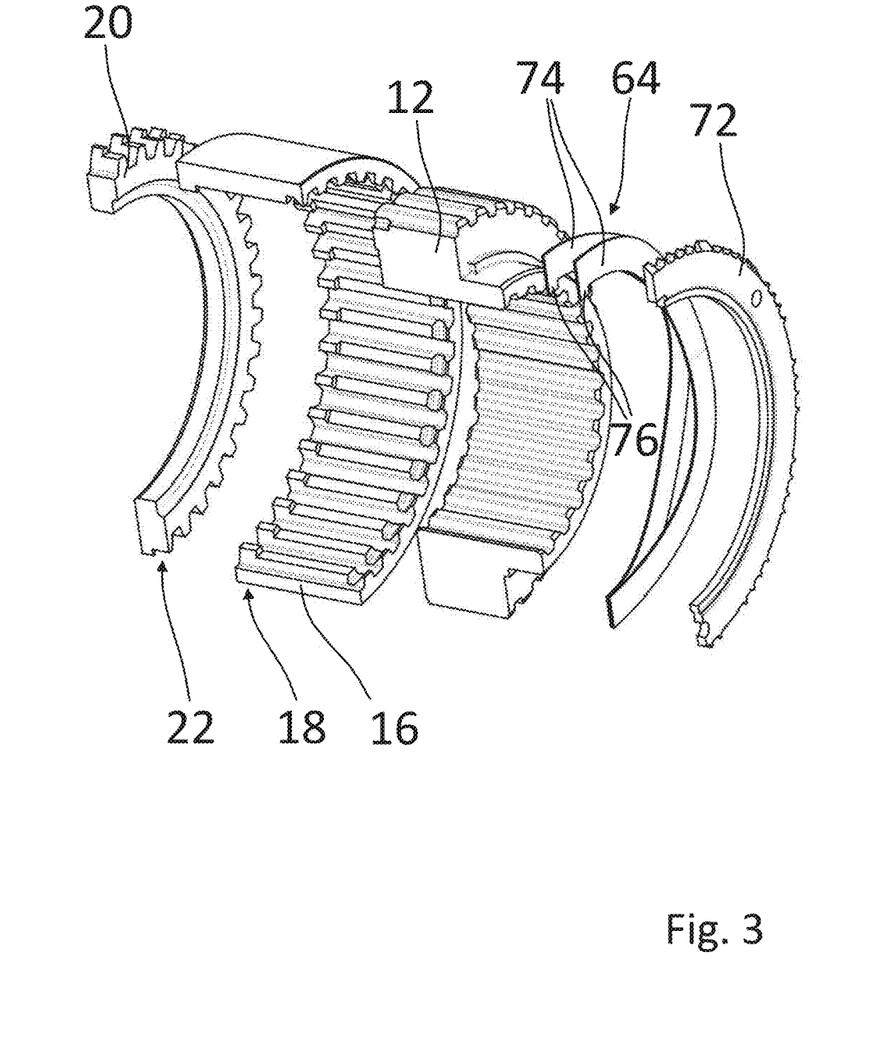
FIG. 3 shows a perspective exploded view of the selector sleeve and of a coupling body and a first shaft of the electromagnetic clutch of FIG. 1.

In accordance with FIGS. 1 to 4, the electromagnetic clutch has two wave springs 74 each provided with lugs 76 (see in particular FIG. 3). The lugs 76 of the wave spring 74 engage in recesses 78 provided on the first shaft 12 such that the two wave springs 74 cannot rotate relative to each other (see in particular FIG. 5*b*).

In the following, the bayonet connection 73 present between the bayonet 72 and the selector sleeve 16 is to be discussed in more detail in particular with reference to FIGS. 3 to 5*b*.

The bayonet connection 73 is formed, on the one hand, by means of a circumferential groove 80 and by a first toothing 82 provided on the interior side of the selector sleeve 16 to the first shaft 12. On the other hand, it is formed by a second toothing 84 provided on the bayonet ring 72.

Figure 5A:
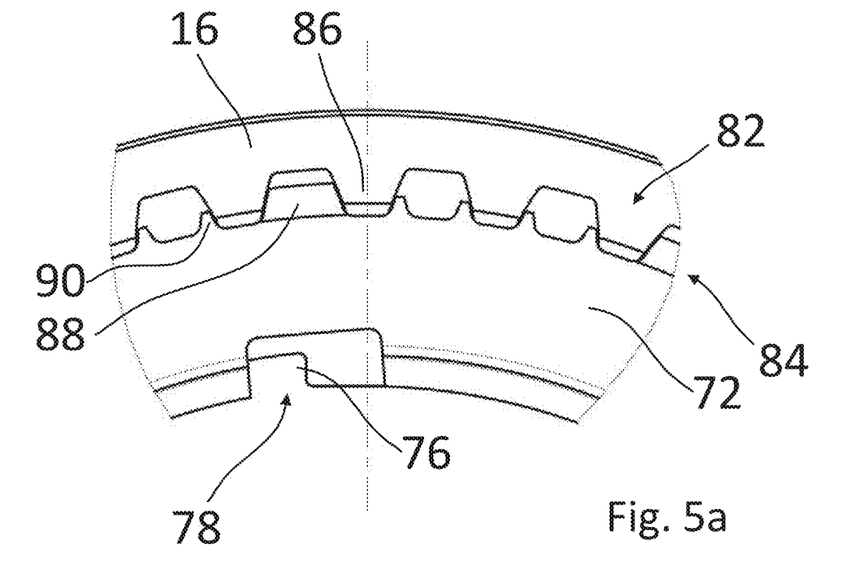
FIG. 5a shows a front view of the selector sleeve, the coupling body and the first shaft of the electromagnetic clutch according to the disclosure in detail.

If the selector sleeve 16 and the bayonet ring 72 are to be connected to each other via the bayonet connection 73, the first and the second toothing 82, 84 of the selector sleeve 16 and the bayonet ring 72 are to be aligned with each other as shown in FIG. 5a, the bayonet ring 72 being first not yet arranged inside the selector sleeve 16.

If the parts have been aligned with each other as shown in FIG. 5a, the bayonet ring 72 can be shifted along the axis of the first shaft 12 towards the selector sleeve 16 (i.e. into the plane in FIG. 5a), such that the latter is received in the selector sleeve 16.

This may result in a pretensioning of the elastic spring unit 64.

Figure 5B:
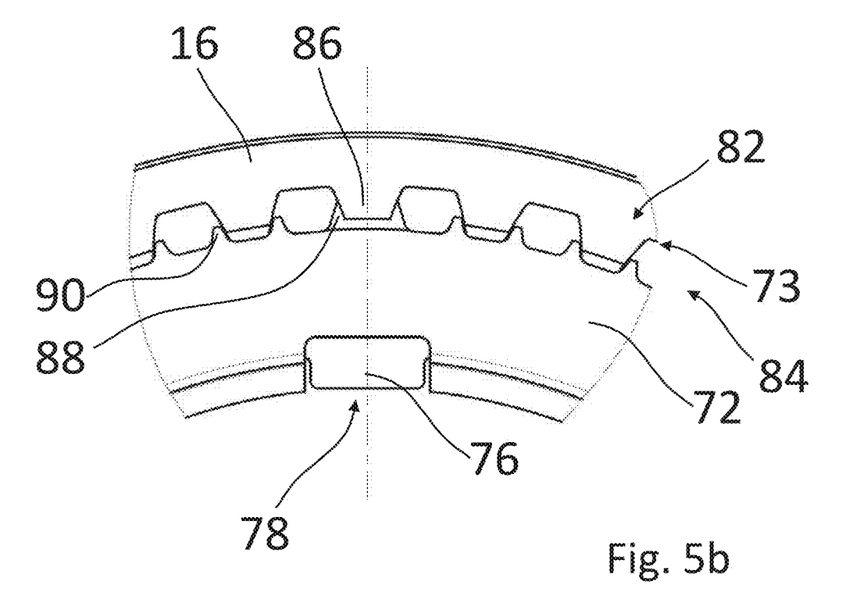
FIG. 5b shows a further front view of the selector sleeve, the coupling body and the first shaft of the electromagnetic clutch according to the disclosure in detail.

If the bayonet ring 72 is inserted axially until it is surrounded by the circumferential groove 80 of the selector sleeve 16, the bayonet ring 72 can be rotated relative to the selector sleeve 16 within the circumferential groove 80. If a rotation of the bayonet ring 72 thus occurs as shown in FIG. 5b, this leads to an at least partial overlapping of the first and the second toothing 82, 84.

If no external force is now applied to the bayonet ring 72, the latter is pushed out of the circumferential groove 80 by the pretensioned spring unit 64, the axial movement thereof out of the selector sleeve 16 being prevented by an overlapping of the first and the second toothing 82, 84.

In this state, the bayonet ring 72 is arrested in the axial direction by the overlapping of first beveled teeth 86 of the first toothing 82 and second beveled teeth 88 of the second toothing 84.

Furthermore, the bayonet ring 72 has third teeth 90 which create a fit in a form-fitting manner in the circumferential direction with the tooth flanks of the first beveled teeth 86 (see in particular FIGS. 4 and 5b) and are thus located therebetween.

Figure 6:
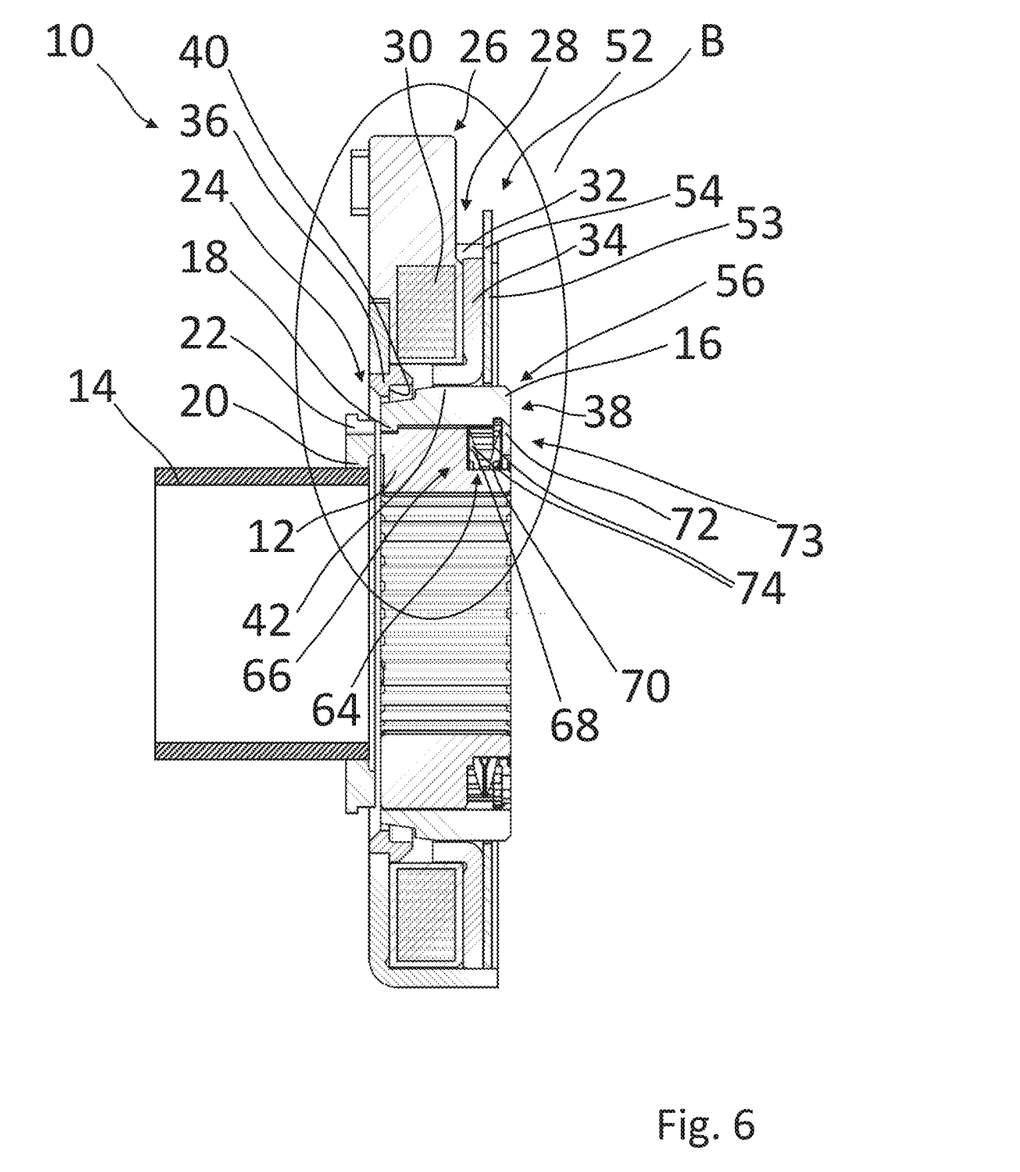
FIG. 6 shows a sectional view of an electromagnetic clutch according to the disclosure with a selector sleeve in the disengaged state according to a second option.

FIG. 6 shows an electromagnetic clutch according to a second option.

In contrast to the first option, the selector sleeve 16 in the second version simultaneously forms the armature ring 38, such that the armature ring 38 is part of the selector sleeve 16 and not an additional component. Accordingly, the selector sleeve 16 is shifted directly by applying a magnetic force to the selector sleeve 16 itself via the coil 30.

In the second option, the guiding webs 58 are optionally omitted in the guiding element 54 of the axial guide 52. This is necessary as the axial guide 52 is fastened to the stator 26 and the selector sleeve 16 moves relative thereto in the engaged state.

It is further conceivable that in the selector sleeve 16 designed as an armature ring of the second option, there is no longer an axial overlapping with the guiding element 54 of the axial guide 52 when the engaged state is reached.

Apart therefrom, the above explanations as to the first option can be applied in an analogous manner to the second option.

In the following, the functional principle and the operation of the electromagnetic clutch 10 according to the first option are to be explained with reference to FIGS. 7 and 8.

Figure 7:
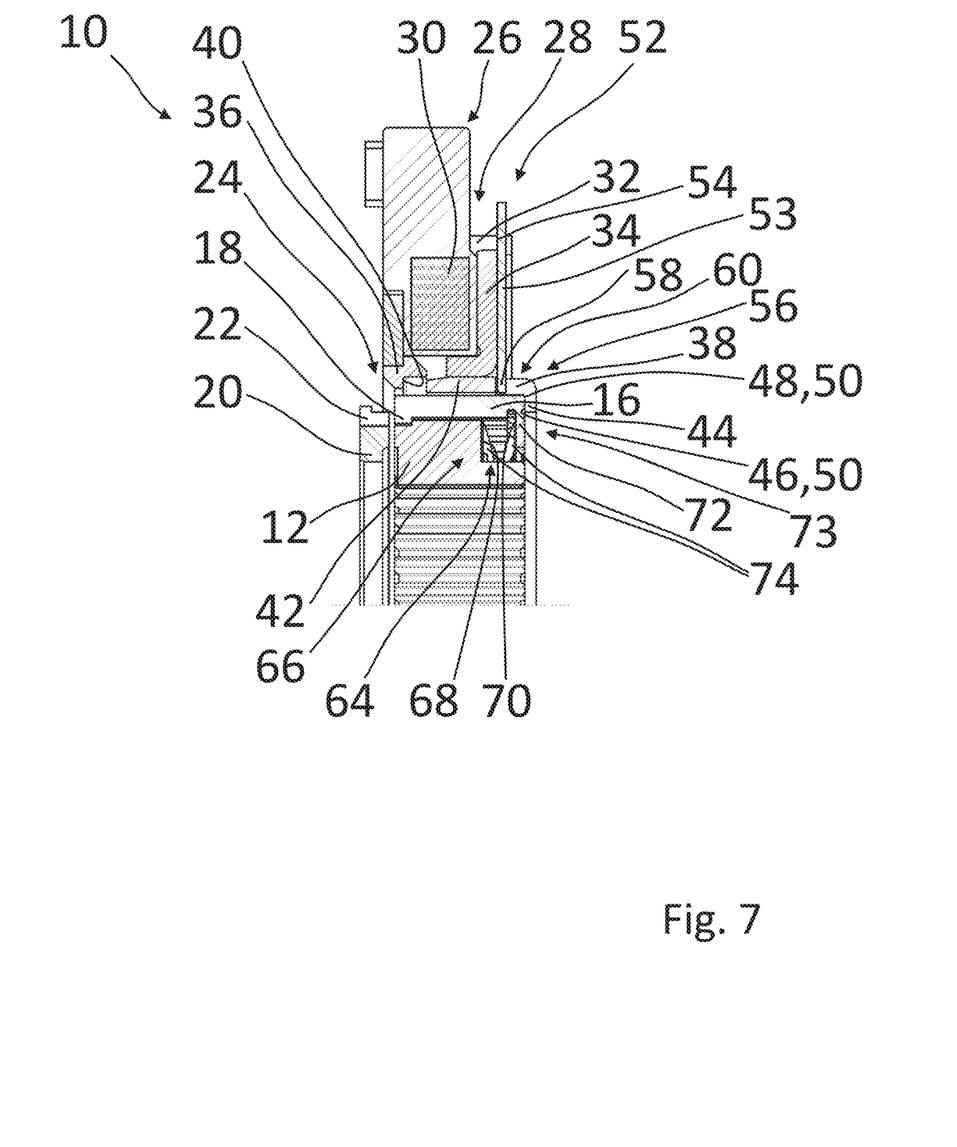
FIG. 7 shows the detail A of the electromagnetic clutch of FIG. 1.
Figure 8:
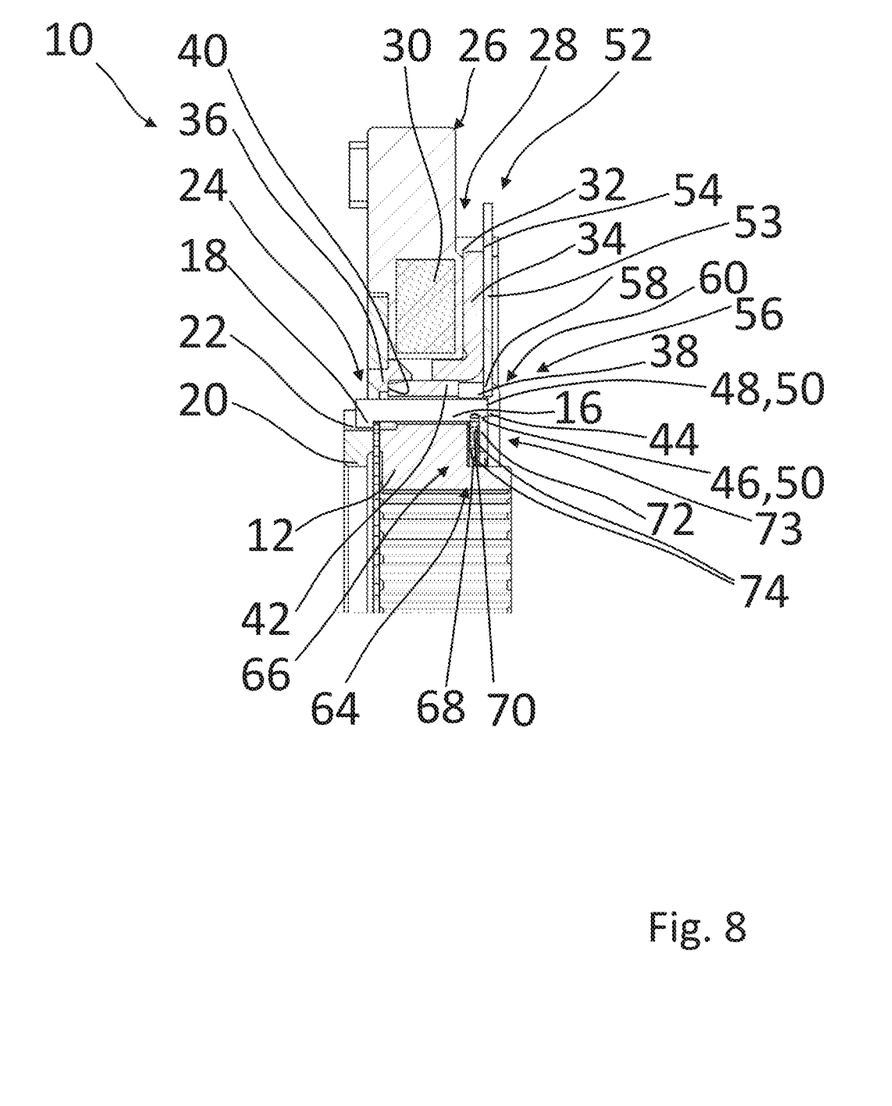
FIG. 8 shows the detail A of the electromagnetic clutch of FIG. 1 with the selector sleeve in the engaged state.

Here, the disengaged state of the selector sleeve 16 forms the initial state, as shown in FIGS. 1 and 7.

Therefore, there is no fit in a form-fitting manner between the first and the second teeth 18, 22 of the selector sleeve 16 and the coupling body 20.

In this disengaged and open state, the selector sleeve 16 is held by the elastic spring unit 64 as long as no external forces act on the selector sleeve 16, the amount of which exceeds the spring force of the spring unit 64.

The movement of the armature ring 38 in the direction of the coupling body 20 is thus also indirectly prevented, as the latter is in contact via the first axial resting surface 46 provided on the flange 44 and via the second axial resting surface 48 with the selector sleeve 16 fixed in the disengaged state.

The spring unit 64 therefore prevents the armature ring 38 from moving in the axial direction towards the coupling body 20, as long as no additional force acts thereon.

If the selector sleeve 16 is to be shifted from the disengaged state towards the coupling body 20, it is first necessary to apply voltage to the coil 30.

The voltage application to the coil 30 provides a magnetic flux through which a magnetic force acts on the armature ring 38 in the direction of the coupling body 20.

If the amount of the magnetic force exceeds the amount of the spring force which acts on the selector sleeve through the spring unit 64 and thus also on the armature ring 38 via the axial resting surfaces 46, 48 which are in contact, the armature ring 38 is moved towards the coupling body 20, the armature ring 38 also shifting the selector sleeve 16 to the coupling body 20 in the direction of the engaged state via the flange 44 and the resting surfaces 46, 48 which are in contact.

This shifting of the armature ring 38 and the selector sleeve 16 entrained via the armature ring 38 is carried out until the armature ring 38 reaches the stop 40 provided on the outer housing 28. The selector sleeve 16 is thus in the engaged state. When the coil 30 is energized, a magnetic holding force thus acts on the armature ring (see FIG. 8).

In the engaged state, the first and the second teeth 18, 22 engage each other so that there is a fit in a form-fitting manner between the selector sleeve 16 and the coupling body 20.

As soon as the first and the second teeth 18, 22 engage each other, this may result in a rotary relative movement between the selector sleeve 16 and the armature ring 38 which is arranged in a rotationally fixed manner on the stator 26 due to the guiding element 54.

When the first axial resting surface 46 and the second axial resting surface 48 contact each other, friction can occur between the armature ring 38 and the selector sleeve 16. However, as explained above, this can be reduced due to the lubricant layer 50. The resting surfaces 46, 48 can additionally be hardened. Both are intended to contribute to the reduction of signs of wear.

The shifting results in that the dimensions of the space 66 in the axial direction decrease, the elastic spring unit 64 being thus compressed and exerting on the selector sleeve 16 a restoring force in the direction opposite to the magnetic force towards the disengaged state.

In accordance with the above explanations, it is conceivable that the first and/or the second teeth 18, 22 are provided with lateral undercuts in the axial direction and in the direction of the engaged state.

If the first and/or the second teeth 18, 22 have undercuts, a torque transmission between the coupling body 20 and the first shaft 12 results in the generation of a force on the selector sleeve 16 in the direction of the engaged state, i.e. towards the coupling body 20 due to the undercuts and the wedge effect thus produced between the contacting teeth.

The force acting on the selector sleeve 16 largely depends on the geometry of the undercuts of the teeth 18, 22 and the torque present. This results in that the selector sleeve 16 is thus moved relative to the armature ring 38 towards the coupling body 20, so that the axial overlapping of the first and the second teeth 18, 22 is increased.

As a result of the relative shifting, there is no contact between the armature ring and the selector sleeve on the first and the second axial resting surface 46, 48, so that due to the rotary relative movement between the components, no friction can occur at the resting surfaces 46, 48.

If the selector sleeve 16 now has to be shifted back into the disengaged state, it is first necessary to reduce or eliminate the magnetic force generated by the voltage applied to the coil 30.

If the amount of the magnetic force acting on the armature ring 38 is below the amount of the restoring force of the elastic spring unit 64 which acts on the selector sleeve 16 or the bayonet ring 72 coupled to the selector sleeve 16, this leads to a shifting of the selector sleeve 16 along with the armature ring 38 from the engaged state back into the disengaged state as shown in FIG. 7.

In this state, the selector sleeve 16 is again held by the spring force of the elastic spring unit 64 as explained above.

During the entire shifting of the armature ring 38 along the first shaft 12, it is guided by the axial guide 52 and the guiding element 54 thereof. In the axial direction, the guidance is carried out as explained above along the envelope of the circular cylindrical section 42 of the armature ring 38 by means of the radial guiding surface 62.

At the same time, the rotation of the armature ring 38 is prevented in that the guiding webs 58 of the guiding geometry 56 engage into the guiding grooves 60 of the armature ring 38.

Furthermore, the functional principle and the operation of the electromagnetic clutch 10 according to the second option are to be discussed with reference to FIGS. 9 and 10, wherein the above explanations as to option 1 generally also apply to the electromagnetic clutch 10 according to option 2.

Figure 9:
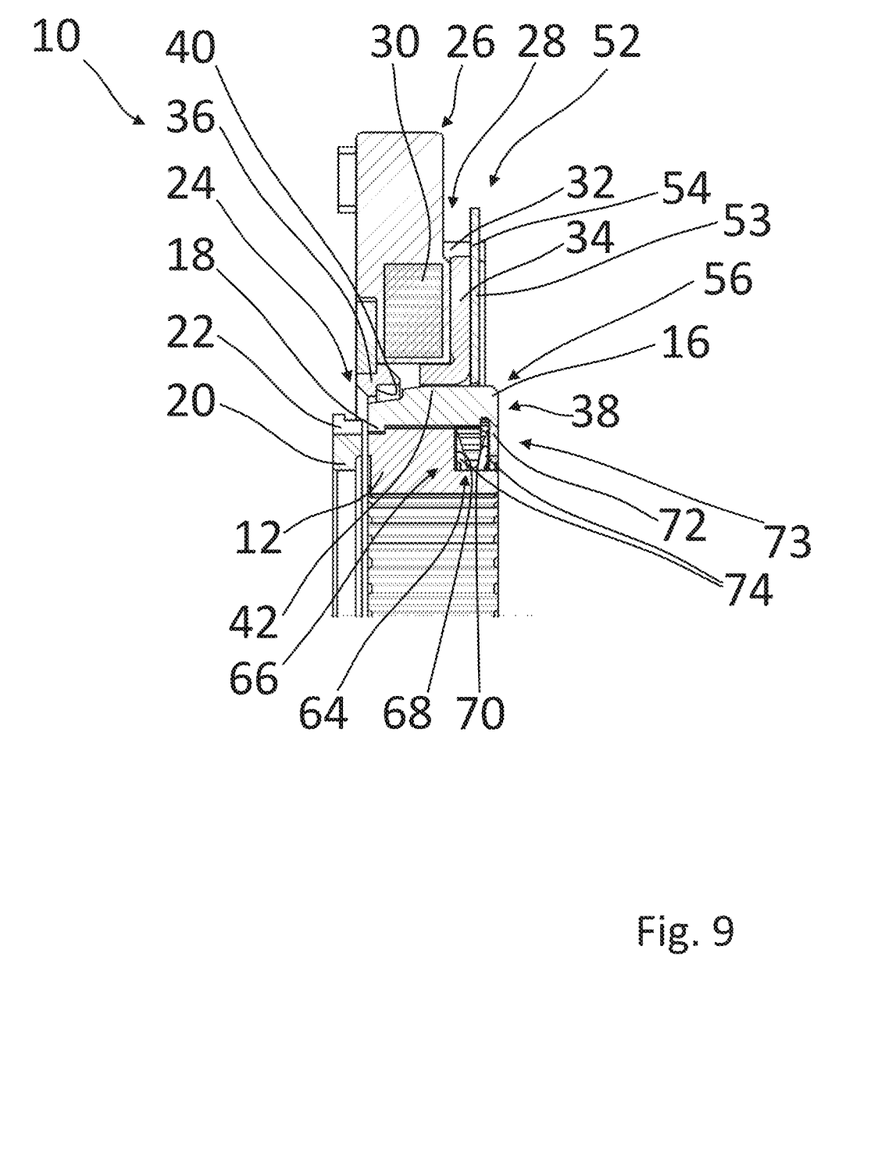
FIG. 9 shows the detail B of the electromagnetic clutch of FIG. 6.

FIG. 9 shows the selector sleeve 16 designed as an armature ring in the disengaged position. In contrast to option 1, the magnetic force for shifting the selector sleeve 16 in the electromagnetic clutch according to option 2 is applied directly by the coil 30 to the selector sleeve 16, as it acts itself as an armature ring.

As explained above, the selector sleeve 16 designed as an armature ring is guided along the first shaft 12 by means of the guiding geometry 56 of the axial guide 52, so that a defined radial gap is formed between the selector sleeve 16 and the outer housing 28 of the stator 26.

Figure 10:
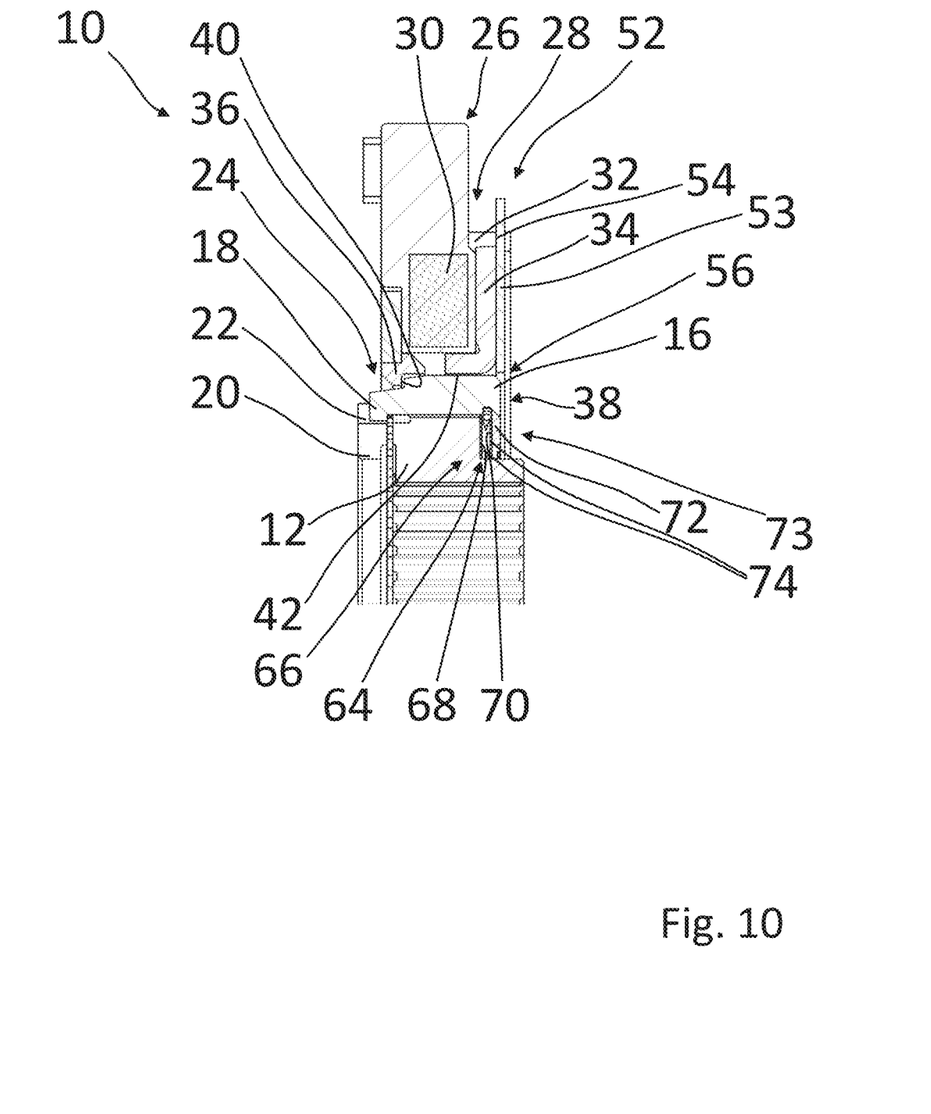
FIG. 10 shows the detail B of the electromagnetic clutch of FIG. 6 with the selector sleeve in the engaged state.

FIG. 10 shows the selector sleeve 16 in the engaged state, wherein in this state, the selector sleeve 16 is no longer guided by the axial guide 52 to prevent friction between the guiding element 54 of the axial guide 52 and the selector sleeve moving relative thereto.

The holding force applied by the energized coil 30 via the stop 40 acts directly on the selector sleeve 16 and holds the latter in the engaged state as long as the magnetic force exceeds the amount of the restoring force of the elastic spring unit 64.

If this is no longer the case, the selector sleeve 16 moves back, wherein it comes into contact with the axial guide 52 again and is accordingly moved in a defined manner along the first shaft. This takes place until the selector sleeve has reached the disengaged state again as shown in FIG. 9.

The invention claimed is:

1. An electromagnetic clutch, comprising:
    a selector sleeve which is arranged in a rotationally fixed manner on a first shaft and is adapted to be shifted linearly along the first shaft between an engaged state and a disengaged state;
    a coupling body which is aligned coaxially to the first shaft;
    wherein, in the engaged state, a fit in a form-fitting manner is provided between the selector sleeve and the coupling body so that a rotary connection is between the first shaft and the coupling body; and
    a stator having a coil which serves to shift an armature ring linearly along the first shaft, the armature ring being mounted radially in an axial guide separately from the first shaft and the coupling body,
    wherein a shifting of the armature ring by the coil is also accompanied by a shifting of the selector sleeve,
    wherein the coil, when energized, exerts a magnetic force on the armature ring which acts via the armature ring on the selector sleeve towards the disengaged state or towards the engaged state,
    wherein an elastic spring unit is provided which exerts a restoring force on the selector sleeve which acts in a direction opposite to the magnetic force, and
    wherein a supporting ring is arranged inside the selector sleeve, the supporting ring being configured in the form of a bayonet ring which is adapted to establish a bayonet connection with the selector sleeve and on which the elastic spring unit is supported in the axial direction.

2. The electromagnetic clutch according to claim 1, wherein the armature ring and the selector sleeve are different parts which are adapted to be coupled to each other in the axial direction, and wherein the armature ring has a first axial resting surface which is in contact with a second axial resting surface provided on the selector sleeve, at least when the armature ring is shifted by the coil.

3. The electromagnetic clutch according to claim 2, wherein the armature ring is mounted radially in the axial guide separately from the selector sleeve.

4. The electromagnetic clutch according to claim 3, wherein the first and/or the second axial resting surface are/is coated with a lubricant layer and/or hardened.

5. The electromagnetic clutch according to claim 1, wherein a shifting of the armature ring by the coil is limited by a stop, and wherein in the event of a contacting between the armature ring and the stop when the coil is energized, a magnetic holding force is present which acts on the armature ring.

6. The electromagnetic clutch according to claim 1, wherein the stator comprises at least an outer housing which extends at least partially along the coil, and wherein a guiding geometry is formed between the outer housing and the armature ring and/or between an additional guiding element and the armature, which axially guides the armature ring along the axis of the first shaft.

7. The electromagnetic clutch according to claim 6, wherein the guiding geometry has at least one guiding web which projects into a guiding groove and prevents the armature ring from rotating relative to the stator, and a radial guiding surface which guides the armature ring concentrically to the stator.

8. The electromagnetic clutch according to claim 1, wherein the restoring force exerted on the selector sleeve by the elastic spring unit also acts on the armature ring.

9. The electromagnetic clutch according to claim 1, wherein the elastic spring unit is arranged inside the selector sleeve and is supported in the axial direction directly or indirectly on the selector sleeve and on the first shaft.

10. The electromagnetic clutch according to claim 1, wherein the bayonet connection is formed, on the one hand, by a circumferential groove and a first toothing each provided on the interior side of the selector sleeve towards the first shaft, and, on the other hand, by a second toothing provided on the bayonet ring.

11. The electromagnetic clutch according to claim 1, wherein the elastic spring unit comprises at least one wave spring.

12. An electromagnetic clutch, comprising:
a selector sleeve which is arranged in a rotationally fixed manner on a first shaft and is adapted to be shifted linearly along the first shaft between an engaged state and a disengaged state;
a coupling body which is aligned coaxially to the first shaft;
wherein, in the engaged state, a fit in a form-fitting manner is provided between the selector sleeve and the coupling body so that a rotary connection is between the first shaft and the coupling body; and
a stator having a coil which serves to shift an armature ring linearly along the first shaft, the armature ring being mounted radially in an axial guide separately from the first shaft and the coupling body,
wherein a shifting of the armature ring by the coil is also accompanied by a shifting of the selector sleeve, and
wherein the selector sleeve also forms the armature ring.

13. An electromagnetic clutch, comprising:
a selector sleeve which is arranged in a rotationally fixed manner on a first shaft and is adapted to be shifted linearly along the first shaft between an engaged state and a disengaged state;
a coupling body which is aligned coaxially to the first shaft;
wherein, in the engaged state, a fit in a form-fitting manner is provided between the selector sleeve and the coupling body so that a rotary connection is between the first shaft and the coupling body; and
a stator which has a coil which serves to shift an armature ring linearly along the first shaft, the armature ring being mounted radially in an axial guide separately from the first shaft and the coupling body,
wherein a shifting of the armature ring by the coil is also accompanied by a shifting of the selector sleeve,
wherein the coil, when energized, exerts a magnetic force on the armature ring which acts via the armature ring on the selector sleeve towards the disengaged state or towards the engaged state, and
wherein an elastic spring unit is provided which exerts a restoring force on the selector sleeve which acts in a direction opposite to the magnetic force, the elastic spring unit including at least two wave springs each having lugs which engage into a recess such that the at least two wave springs cannot rotate relative to each other.

* * * * *